United States Patent [19]

Marshek et al.

[11] Patent Number: 4,762,005

[45] Date of Patent: Aug. 9, 1988

[54] ABRASIVE GRINDING BELT TEST MACHINE

[76] Inventors: Kurt M. Marshek, 9701 Courtleigh Cir., Austin, Tex.; Hyunsoo Kim, Kangdong-Ku, Shinchon-don 7 Jangmi Apt. 19-505, Seoul, Rep. of Korea

[21] Appl. No.: 91,529

[22] Filed: Aug. 31, 1987

[51] Int. Cl.$^4$ .............................................. G01L 5/16
[52] U.S. Cl. ...................................... 73/862.04; 73/9
[58] Field of Search ........... 73/862.04, 862.06, 862.07, 73/9, 158, 159

[56] References Cited

U.S. PATENT DOCUMENTS

| | | | |
|---|---|---|---|
| 3,186,220 | 6/1965 | Flinth | 73/862.04 |
| 3,204,454 | 9/1965 | Friman et al. | 73/862.04 |
| 4,458,527 | 7/1984 | McFarland | 73/146 |
| 4,545,239 | 10/1985 | Himmler et al. | 73/862.04 |

Primary Examiner—Ronald O. Woodiel

[57] ABSTRACT

A machine is presented for measuring normal and tangential belt forces as well as the grinding friction force all versus the angular position for abrasive belt grinding. Normal and tangential force transducers, having the same surface shape and surface finish as the contact pulley, are assembled in the contact pulley. The instrumented contact pulley is used as a driving or driven pulley. A variable speed D.C. motor rotates the driving pulley. A cylindrical workpiece is driven by a variable speed A.C. motor through a torque sensor. The torque sensor determines the grinding friction force between the workpiece and the belt. The A.C. motor-torque sensor assembly is mounted on a carriage plate which slides on two rails with linear bearings. Means are provided for applying a predetermined belt tension and means are also provided for applying a workpiece grinding normal force.

16 Claims, 4 Drawing Sheets

SECTION A-A

SECTION B-B

ABRASIVE GRINDING BELT TEST MACHINE

BACKGROUND OF THE INVENTION

This invention relates to new and useful improvements in machines for measuring the forces between a belt and pulleys as well as the grinding friction forces between a workpiece and the belt in abrasive belt grinding.

In coated abrasive belt grinding, grinding action occurs between the abrasive grains located on the outside surface of the belt and the workpiece. Required power is transmitted to the belt through the belt backing by the pulley. Because of the grinding workpiece normal force exerted in the grinding contact zone, high concentrated pressure exists in the grinding contact area. This concentrated pressure makes an abrasive grinding belt drive different from an ordinary flat belt drive. The concentrated pressure also makes it difficult to measure the belt force distribution throughout the entire arc of contact.

In the design of an efficient grinding belt power transmission drive, it is important to obtain the normal and tangential belt force distribution. Since the abrasive grinding belt is basically a flat belt with the addition of grinding action between the belt and the workpiece, flat belt power transmission theory can be used in the design of abrasive belt grinding machines. As in flat belt power transmission drives, it is essential in designing an efficient belt drive to obtain a distribution of the normal and tangential belt forces between the belt and pulley along the entire arc of contact.

Measurement of the normal and tangential belt force distributions in abrasive belt grinding has been limited to the grinding contact zone using a conventional photoelastic stress technique. No known apparatus has been introduced to determine the normal and tangential belt force distribution in the entire arc of contact when grinding is performed.

The present invention is directed to new force transducers and apparatus for measuring the normal and tangential belt forces versus angular position in the entire arc of contact, and measuring the grinding friction force between the belt and the workpiece in the study of abrasive belt grinding. In this apparatus, attention has been given to determine the effect of the grinding contact forces on the behavior of the grinding belt as a belt drive rather than on determining the stresses at the grinding contact zone.

SUMMARY OF THE INVENTION

The present invention relates to an abrasive grinding belt force measuring and testing apparatus which has special force transducers to determine the normal and tangential forces between the belt and pulley during the grinding operation.

In a specific embodiment, the inventive apparatus comprises an instrumented contact pulley (wheel) in which normal and tangential force transducers are assembled. The normal force transducer, having the same surface shape as the outer cylindrical surface of the pulley, is mounted to slide in a linear ball bushing. The tangential force transducer, also having the same surface shape as the contact wheel, looks like a cantilever beam with attached head. The instrumented contact wheel is used as a driving or driven pulley. The driving pulley is rotated by a variable speed D.C. motor with speed controller. A variable speed A.C. motor is mounted on a carriage plate which slides on two rails with linear bearings. A cylindrical workpiece is driven by the A.C. motor through a torque sensor which determines the grinding friction force between the workpiece and the belt. Initial belt tension is applied to the belt with a deadweight which is attached through a cord. The workpiece grinding normal force is applied with a deadweight. A potentiometer is connected to the end of the driven or driving pulley shaft to determine the angular position.

The invention further utilizes other size flat belts and contact pulleys with different surface finishes to determine concentrated load drive characteristics for various flat belts. Instrumentation is provided to display, record, and store normal and tangential belt forces, grinding friction force, and angular position.

It is accordingly an objective of the present invention to provide a new and improved apparatus for determining the normal and tangential belt forces and grinding friction forces in abrasive belt grinding.

This objective of the present invention as well as that of the attendant advantages thereof, will become more readily apparent when reference is made to the following description, taken in accordance with the accompanying drawings.

DETAILED DESCRIPTION OF THE DRAWINGS

Figure 1:
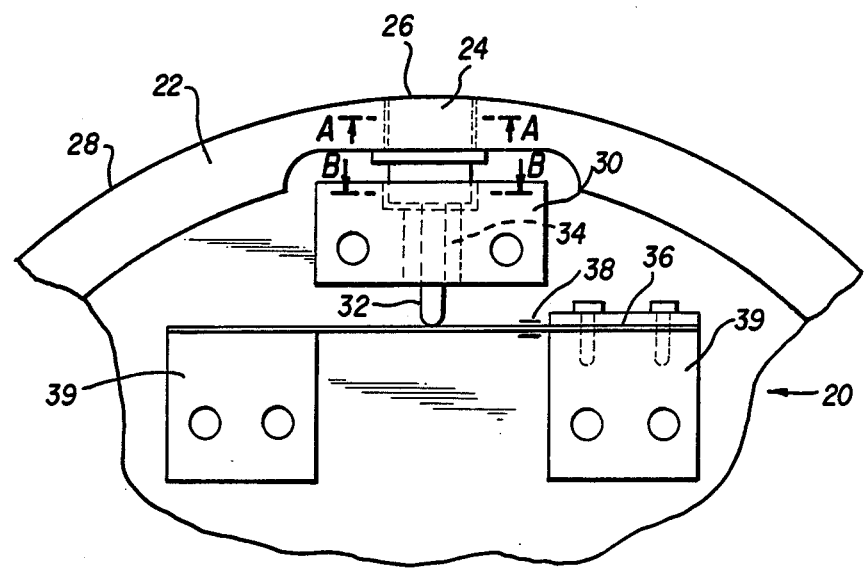
FIG. 1 is a drawing of the normal force transducer.
Figure 2:
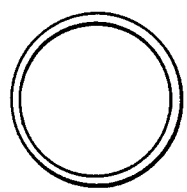
FIG. 2 is a sectional view taken along line A—A of FIG. 1.

With reference to FIGS. 1 and 2, the normal and tangential force transducers will be described.

FIG. 1 shows a normal force transducer 20 as assembled in the pulley contact wheel 22. Normal force transducer head 24 has a precision machined surface 26 which has the same radius of curvature as the contact wheel surface 28. The bottom section of the head 24 has a square fit with the mounting block 30 to prevent the head from rotating. A case hardened stainless-steel shaft 32 is connected to the transducer head 24 and slides in a ⅜ inch diameter linear ball bushing 34. The normal component of the force between a belt and the transducer head 24 is transmitted to a spring plate 36 on which are mounted four strain gauges 38. The spring plate 36 is held by mounting plate 39 which is attached to the pulley 22. An initial displacement of the head 24 above the contact wheel surface 28 is needed in order to measure the normal pressure, and can be effected by the initial deflection of the spring plate 36 during assembly.

The tangential force transducer 40 is shown in FIG. 2 as assembled in the contact wheel 22. The tangential force transducer head 42 also has the same contour surface 46 as the contact wheel surface 28; i.e., the same radius of curvature and the same surface characteristics as for the contact wheel 22. Four strain gauges 48, which form a full-bridge, are mounted on the cantilever beam 50 of the transducer 40. The diameter of the force transducer head 42 is 9/16 inch and is less than the width of the workpiece which is 1¼ inch. This prevents excessive contact force which may cause permanent deformation of the cantilever beam 50 when the transducer head 42 is loaded while in the workpiece contact area.

The normal and tangential force transducers 20, 40 are assembled in the same contact wheel 22. The normal force transducer position is rotated 90 degrees from the tangential force transducer position. Thus, the measurement of the angular position of the one force transducer gives the angular position of the other one.

Figure 3:
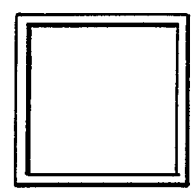
FIG. 3 is a sectional view taken along line B—B of FIG. 1.

FIG. 3 show top and side views of the abrasive belt grinding test machine. The instrumented pulley contact wheel 22 where the normal and tangential force transducers 20, 40 are assembled can be used as a driving pulley 52 or driven pulley 54.

For driving pulley 52 (contact wheel 22) belt grinding, the instrumented pulley contact wheel 22 is used as a driving pulley 52. The driving pulley 52 is rotated by a variable speed D.C. motor 56 placed on support block 57. The speed of the D.C. motor is controlled by a speed controller 58. The driving pulley 52 drives a driven pulley 54 of the same diameter by means of an abrasive belt 60. The driven pulley 54 is mounted on shaft 62 held by two pillow blocks 64, 66. The pillow blocks 64, 66 are mounted on a transverse sliding plate 68 which is bolted to linear bearings 70, 72. The linear bearings 70, 72 run on two ⅜ inch diameter stainless steel rails 74. The two rails are attached to the top of the table 76.

The four inch diameter steel workpiece 78 is driven by a variable speed A.C. motor 80 through a coupling 82 and a torque sensor 84. The variable speed A.C. motor 80 is controlled by speed controller 86. The torque sensor 84 measures the torque which is transmitted by a friction force created between the abrasive grinding belt 60 and the workpiece 78. The torque sensor 84 is connected to the motor shaft by an elastic jaw type coupling 82. The coupling 82 allows for misalignment. The torque sensor 84 and the A.C. motor 80 as an assembly are mounted on a carriage plate 88 which slides on rails 74.

The workpiece 78 is rotated at 400 rpm opposite in direction to that of the driving pulley 52 (contact wheel 22) to maintain a smooth belt grinding operation.

Initial belt tension is applied to the belt 60 with a deadweight 90 which is attached through a cord 92 and over a roller 94 to sliding carriage 68. The normal force on the grinding workpiece 78 is applied with a deadweight 96, which is attached through a cord 98 and over a roller 100 to sliding carriage plate 88. Different normal grinding forces can be applied simply by adding or substracting deadweights.

A ten-turn potentiometer 102 is connected to the inner bore of the slip rings 104 in order to determine the pulley angular position for driving pulley contact wheel belt grinding experiments. The electrical outputs from the strain gauges in the pulley 52 (contact wheel 22) are transmitted by the slip rings 104 to a computer data acquisition system. The experimental data are recorded, stored, and plotted with the aid of a data acquisition and computer system.

Figure 4:
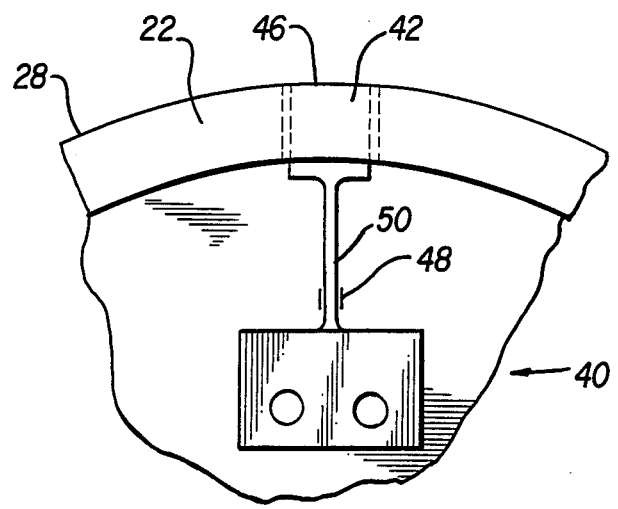
FIG. 4 is a drawing of the tangential force transducer.
Figure 5:
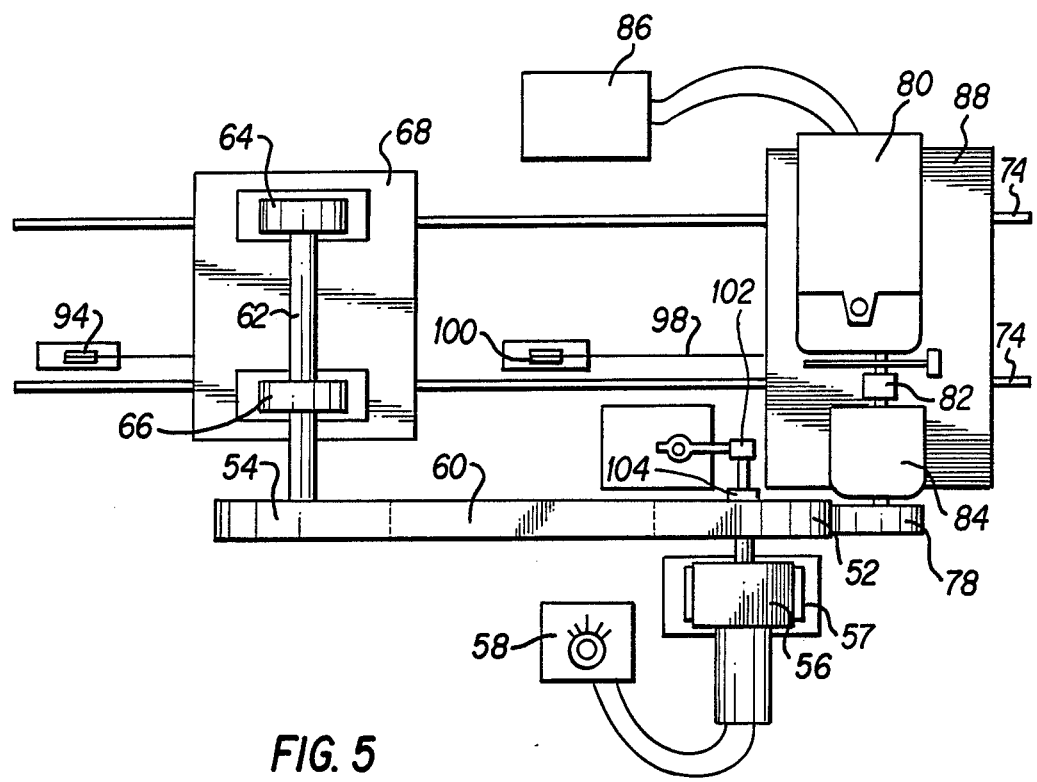
FIG. 5 is a top view of the abrasive belt grinding test machine.
Figure 6:
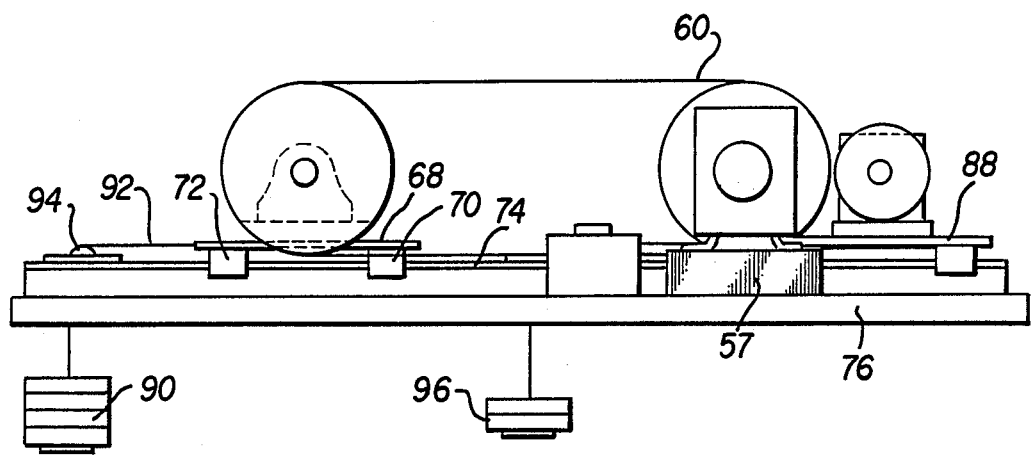
FIG. 6 is a top view and a side view of the abrasive belt grinding test machine with the workpiece loading the driving pulley.
Figure 7:
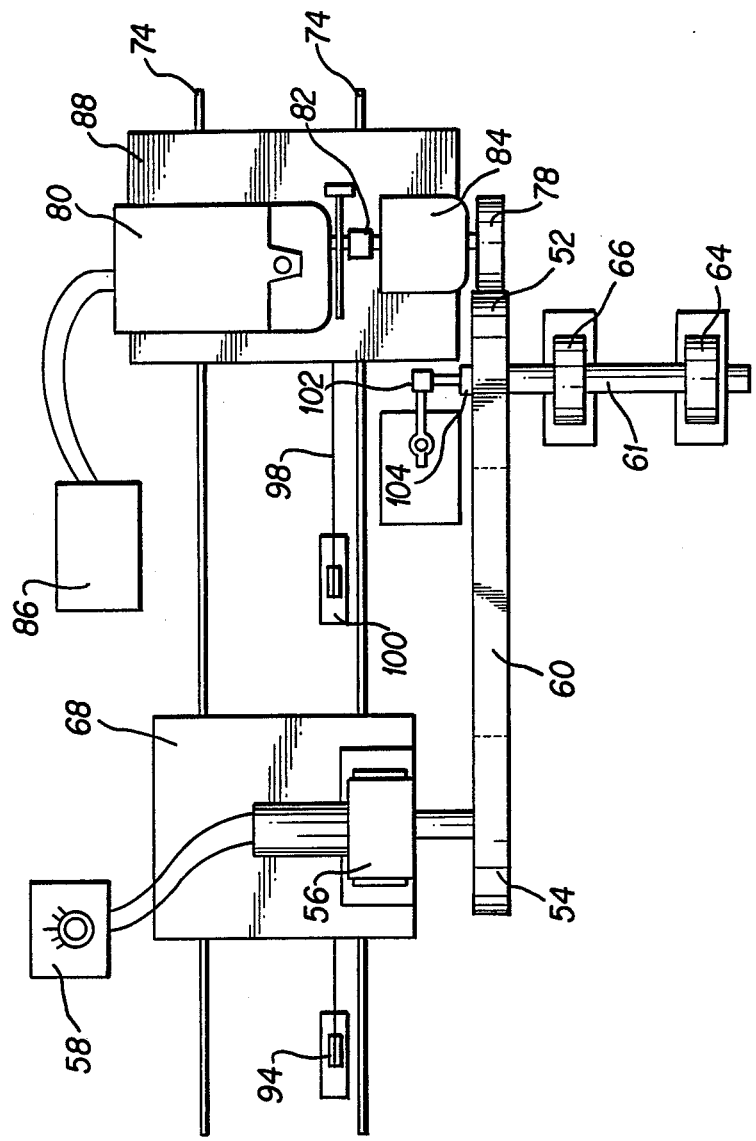
FIG. 7 is a top view of the abrasive belt grinding test machine with the workpiece loading the driven pulley.

In FIG. 4, for driven pulley belt grinding, the D.C. motor 56 is mounted on the sliding carriage 68 (after the shaft 62 and bearings 64, 66 are removed from the sliding carriage 68 as positioned in FIG. 3 (top view)). In FIG. 4, the pulley 54 is attached to the shaft of the D.C. motor 56. The pulley 52, which is now driven, is mounted on the end of a short shaft 61. The short shaft 61 is held by bearings 64, 66. The bearings are attached to table top 76. The potentiometer 102 is connected to one end of short shaft 61.

Above, a specific embodiment of the present invention has been described. It should be appreciated, however that this embodiment was described for purposes of illustration only, without any intention of limiting the scope of the present invention. Rather, it is the intention that the present invention be limited not by the above but only as is defined by the appended claims.

What is claimed is:

1. An apparatus for measuring the normal and tangential belt forces between a belt and a driving pulley (contact wheel) as well as the workpiece grinding friction force between a workpiece and the belt, with respect to pulley angular position, for abrasive belt grinding, the apparatus comprising:

an instrumented driving pulley (contact wheel) in which normal and tangential force transducers are assembled;

a first motor which rotates the said driving pulley;

a belt means connecting the driving pulley to a driven pulley whereby said belt means contacts the workpiece;

a second motor which rotates said workpiece and is mounted on first sliding means;

a first loading means connected to said first sliding means for applying a workpiece grinding normal force;

a second sliding means on which the driven pulley is mounted for driving pulley (contact wheel) belt grinding;

a second loading means connected to said second sliding means for applying the belt initial tension.

2. The apparatus recited in claim 1 wherein said workpiece has various contact position with the belt while the belt wraps the driving pulley (contact wheel).

3. The apparatus recited in claim 1 wherein the workpiece rotational direction and speed can be controlled.

4. The apparatus recited in claim 1 wherein the outer peripheral surface of the instrumented driving pulley (contact wheel) is changed by means of machining, by adding a coating, or the like.

5. The apparatus recited in claim 1 wherein the workpiece is a rotating cylindrical workpiece.

6. The apparatus recited in claim 1 wherein a workpiece with a constant cross-section is feed radially in toward the center of the driving pulley (contact wheel).

7. The apparatus recited in claim 1 wherein said normal force transducer has a head with surface having the same radius of curvature and the same surface shape and surface finish as the peripheral surface of the driving pulley (contact wheel), and is mounted to slide in a linear ball bushing and supported by a spring plate on which strain gauges are attached.

8. The apparatus recited in claim 1 wherein said tangential force transducer is designed like a cantilever beam with head, having the same radius of curvature and the same surface shape and finish as the driving pulley (contact wheel).

9. The apparatus recited in claim 1 wherein said motor which rotates the driving pulley is a D.C. motor.

10. The apparatus recited in claim 1 wherein said motor which rotates the workpiece and is mounted on a sliding carriage is an A.C. motor.

11. The apparatus recited in claim 1 wherein said first and second sliding means are carriage plates which slide on rails by means of linear bearings.

12. The apparatus recited in claim 1 wherein a torque sensor is connected to one end of said second motor which rotates the workpiece, for measuring the workpiece grinding friction force between the workpiece and the belt.

13. The apparatus recited in claim 1 wherein a potentiometer is connected to said driven pulley shaft or said driving pulley shaft to determine pulley angular position.

14. The apparatus recited in claim 1 wherein said load system is a deadweight connected to said first sliding means via a cord and over a roller for applying a workpiece grinding normal force.

15. The apparatus recited in claim 1 wherein said second load system is a deadweight connected to said second sliding means via a cord and over a roller for applying the belt initial tension.

16. The apparatus for measuring the normal and tangential belt forces between a belt and a driven pulley (contact wheel) as well as the workpiece grinding friction force between a workpiece and the belt, with respect to pulley angular position, for abrasive belt grinding, the apparatus comprising:
- an instrumented driven pulley (contact wheel) in which normal and tangential force transducers are assembled;
- a belt means connecting the driven pulley (contact wheel) to a driving pulley whereby said belt contacts a workpiece;
- a first motor which rotates the said driving pulley;
- a second motor which rotates said workpiece and is mounted on first sliding means;
- a first loading means connected to said first sliding means for applying a workpiece grinding normal force;
- a second sliding means on which the driving pulley is mounted for driven pulley (contact wheel) belt grinding;
- a second loading means connected to said second sliding means for applying the belt initial tension.

* * * * *